US012748667B2

(12) United States Patent
Zhang

(10) Patent No.: US 12,748,667 B2
(45) Date of Patent: Sep. 29, 2026

(54) TIERING-AWARE SNAPSHOTTING FOR MULTIPLE-TIER STORAGE SYSTEMS

(71) Applicant: Dell Products L.P., Round Rock, TX (US)

(72) Inventor: Weibing Zhang, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/989,437

(22) Filed: Dec. 20, 2024

(65) Prior Publication Data

US 2026/0161516 A1 Jun. 11, 2026

(30) Foreign Application Priority Data

Dec. 6, 2024 (CN) ......................... 202411793221.9

(51) Int. Cl.

| | |
|---|---|
| ***G06F 17/00*** | (2019.01) |
| ***G06F 7/00*** | (2006.01) |
| ***G06F 11/1446*** | (2026.01) |
| ***G06F 16/185*** | (2019.01) |

(52) U.S. Cl.

CPC ........ *G06F 11/1469* (2013.01); *G06F 16/185* (2019.01)

(58) Field of Classification Search

CPC ........................... G06F 11/1469; G06F 16/185

USPC .......................................................... 707/649

See application file for complete search history.

(56) References Cited

U.S. PATENT DOCUMENTS

| | | | | |
|---|---|---|---|---|
| 9,275,060 | B1 * | 3/2016 | Supekar | G06F 16/185 |
| 12,229,431 | B2 * | 2/2025 | Nehra | G06F 3/065 |
| 2018/0232395 | A1 * | 8/2018 | Deshmukh | G06F 3/0643 |
| 2021/0216407 | A1 * | 7/2021 | Borate | G06F 11/1448 |
| 2021/0263666 | A1 * | 8/2021 | Yung | G06F 11/1464 |
| 2021/0286677 | A1 * | 9/2021 | Anthony | G06F 11/1435 |
| 2022/0229732 | A1 * | 7/2022 | Chitloor | G06F 11/1451 |
| 2022/0318099 | A1 * | 10/2022 | Kotwal | G06F 11/1435 |
| 2022/0382644 | A1 * | 12/2022 | Yadav | G06F 11/1448 |
| 2024/0275814 | A1 * | 8/2024 | George | H04L 63/1425 |

(Continued)

OTHER PUBLICATIONS

Dell Technologies, "Dell EMC Unity: Introduction to the Platform," Technical White Paper, Jun. 2021, 25 pages.

(Continued)

*Primary Examiner* — Pavan Mamillapalli

(74) *Attorney, Agent, or Firm* — Ryan, Mason & Lewis, LLP

(57) ABSTRACT

An apparatus comprises at least one processing device configured to determine, for a given portion of data of a tiering-aware snapshot that is to be restored to a target storage system comprising a set of two or more storage tiers, tiering information characterizing a given storage tier in which the given portion of data was stored when the tiering-aware snapshot was taken. The at least one processing device is also configured to select, based at least in part on the determined tiering information and storage tier mapping policies mapping the given storage tier to the set of two or more storage tiers of the target storage system, one of the storage tiers of the target storage system. The at least one processing device is further configured to restore the tiering-aware snapshot to the target storage system by storing the given portion of data in the selected storage tier.

20 Claims, 13 Drawing Sheets

(56) References Cited

U.S. PATENT DOCUMENTS

| | | | | |
|---|---|---|---|---|
| 2024/0330118 | A1* | 10/2024 | Shrivastava | G06F 11/1464 |
| 2025/0156277 | A1* | 5/2025 | Hua | G06F 11/1435 |

OTHER PUBLICATIONS

Dell Technologies, "Dell EMC Unity: FAST Technology Overview," Technical White Paper, Feb. 2021, 38 pages.
Dell Technologies, "Dell Unity: Replication Technologies," Technical White Paper, Apr. 2022, 87 pages.
J. Lin et al., "AWQ: Activation-aware Weight Quantization for LLM Compression and Acceleration," arXiv:2306.00978v5, Jul. 18, 2024, 15 pages.
E. Frantar et al., "GPTQ: Accurate Post-Training Quantization for Generative Pre-trained Transformers," arXiv:2210.17323v2, Mar. 22, 2023, 16 pages.

* cited by examiner

400

600

| | | | | | |
|---|---|---|---|---|---|
| range0 | range1 | range2 | range3 | ... | rangeN |
| sliceA | sliceB | sliceC | sliced | ... | sliceN |
| Tier_0 | Tier_0 | Tier_2 | Tier_1 | ... | Tier_0 |

FIG. 6

800 if $Tier_{current} > Tier_{snapshot}$: *# This means that the current tier of a slice (e.g., HDD tier) is higher than the tiering information for that slice kept in the snapshot (e.g., SSD tier)*

Move the slice to $Tier_{snapshot}$;

else:

Keep the slice at its current tier.

FIG. 8

TIERING-AWARE SNAPSHOTTING FOR MULTIPLE-TIER STORAGE SYSTEMS

RELATED APPLICATION

The present application claims priority to Chinese Patent Application No. 202411793221.9, filed on Dec. 6, 2024 and entitled "Tiering-Aware Snapshotting for Multiple-Tier Storage Systems," which is incorporated by reference herein in its entirety.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for tiering-aware snapshotting for multiple-tier storage systems.

In one embodiment, an apparatus comprises at least one processing device comprising a processor coupled to a memory. The at least one processing device is configured to determine, for a given portion of data of a tiering-aware snapshot that is to be restored to a target storage system comprising a set of two or more storage tiers, tiering information characterizing a given storage tier in which the given portion of data was stored when the tiering-aware snapshot was taken. The at least one processing device is also configured to select, based at least in part on (i) the determined tiering information characterizing the given storage tier in which the given portion of data was stored when the tiering-aware snapshot was taken and (ii) one or more storage tier mapping policies mapping the given storage tier to the set of two or more storage tiers of the target storage system, one of the storage tiers in the set of two or more storage tiers of the target storage system in which to store the given portion of data when restoring the tiering-aware snapshot to the target storage system. The at least one processing device is further configured to restore the tiering-aware snapshot to the target storage system by storing the given portion of data in the selected one of the storage tiers in the set of two or more storage tiers of the target storage system.

These and other illustrative embodiments include, without limitation, methods, apparatus, networks, systems and processor-readable storage media.

BRIEF DESCRIPTION OF THE DRAWINGS

FIG. 6 shows an example of a tiering-aware snapshot metadata in an illustrative embodiment.

FIG. 8 shows an example of snapshot mapping rules for tiering-aware snapshotting in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
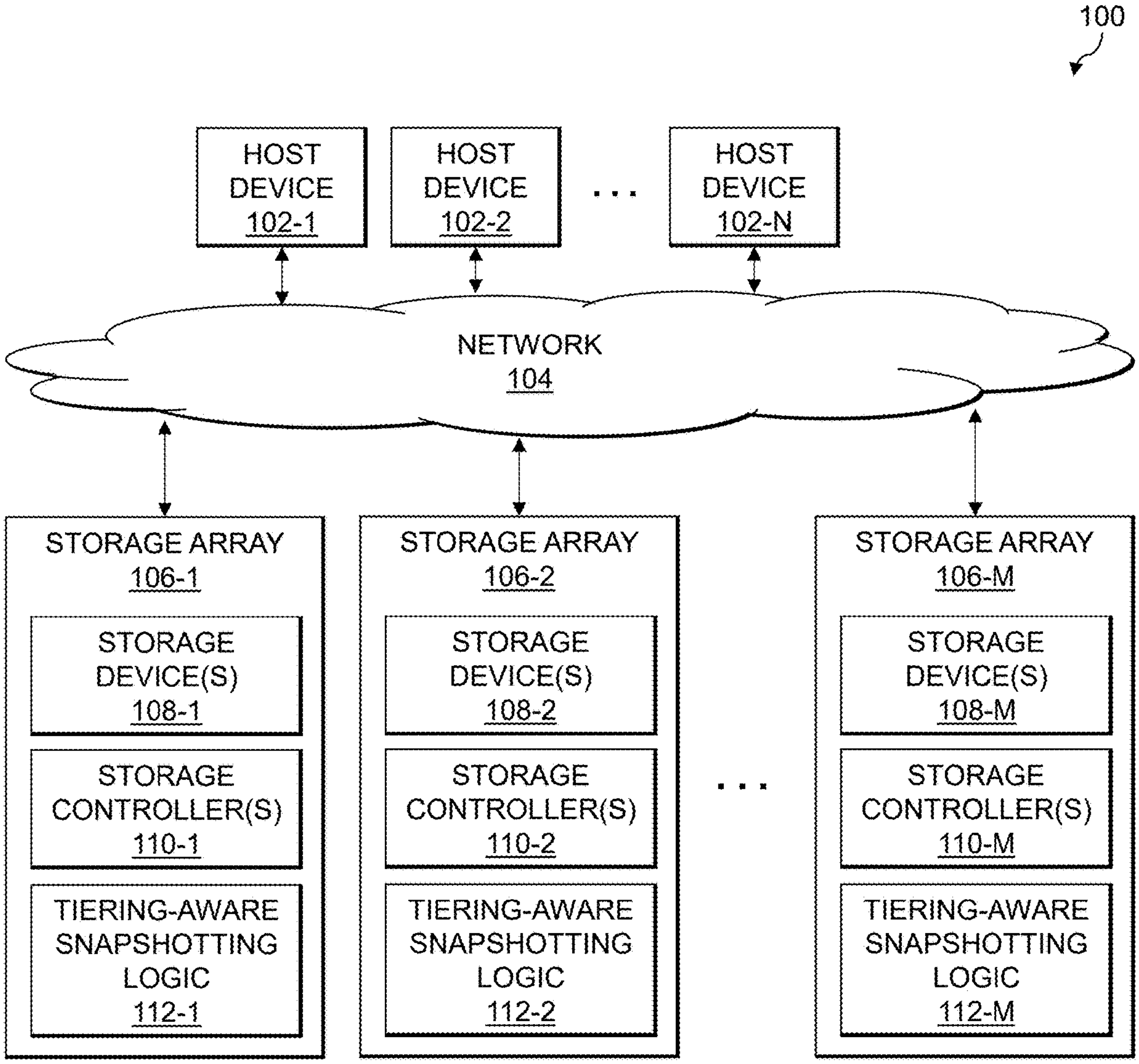
FIG. 1 is a block diagram of an information processing system configured for tiering-aware snapshotting for multiple-tier storage systems in an illustrative embodiment.

FIG. 1 shows an information processing system 100 configured in accordance with an illustrative embodiment to provide functionality for tiering-aware snapshotting for multiple-tier storage systems. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage arrays 106-1, 106-2, . . . 106-M, as shown in FIG. 1, comprise respective pluralities of storage devices 108-1, 108-2, . . . 108-M (collectively, storage devices 108) and respective sets of one or more storage controllers 110-1, 110-2, . . . 110-M (collectively, storage controllers 110). The storage devices 108 each store data that is utilized by one or more applications running on the host devices 102. The storage devices 108 on each of the storage arrays 106 are illustratively arranged in one or more storage pools. The storage controllers 110 facilitate IO processing for the storage devices 108. The storage array 106-1 and its associated storage devices 108-1 are an example of what is more generally referred to herein as a "storage system." Similarly, the storage array 106-2 and its associated storage devices 108-2 and the storage array 106-M and its associated storage devices 108-M are examples of storage systems. These storage systems in the present embodiment are shared by the host devices 102, and are therefore also referred to herein as "shared storage systems." In embodiments where there is only a single host device 102, the host device 102 may be configured to have exclusive use of the storage systems. In some embodiments, at least a subset of the storage arrays 106 may be part of a storage cluster (e.g., where the storage arrays 106 may be used to implement one or more storage nodes in a cluster storage system comprising a plurality of storage nodes interconnected by one or more networks), and the host devices 102 are assumed to submit IO operations to be processed by the storage cluster.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage arrays 106 may implement logical units (LUNs) configured to store objects for users associated with the host devices 102. These objects can comprise files, blocks or other types of objects. The host devices 102 interact with the storage arrays 106 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage arrays 106 to include different portions of one or more physical storage devices. Storage devices 108 may therefore be viewed as comprising respective LUNs or other logical storage volumes.

The storage devices 108 of the storage arrays 106 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

In some embodiments, the storage arrays 106 in the FIG. 1 embodiment provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

The storage controllers 110 of the storage arrays 106 are assumed to implement functionality for tiering-aware snapshotting (e.g., for a single one of the storage arrays 106 having multiple storage tiers, across different ones of the storage arrays 106 having multiple storage tiers, from one or more of the storage arrays 106 to other storage arrays or storage systems not explicitly shown in FIG. 1 which have multiple storage tiers, etc.). Such functionality is provided via tiering-aware snapshotting logic 112-1, 112-2, . . . 112-M (collectively, tiering-aware snapshotting logic 112) on the storage arrays 106-1, 106-2, . . . 106-M. The tiering-aware snapshotting logic 112 is configured to generate tiering-aware snapshots (e.g., of one or more storage volumes on one or more of the storage arrays 106), where the tiering-aware snapshots include tiering information characterizing which of the storage tiers of the storage arrays 106 where different portions of data is stored when the tiering-aware snapshots are taken. The tiering-aware snapshotting logic 112 is also configured to restore tiering-aware snapshots by utilizing the tiering information associated with the tiering-aware snapshots to select the storage tier that each portion of data should be restored to. This may include, for example, moving data on the storage arrays 106 which was moved as part of auto-tiering functionality of the storage arrays 106 in the time between the tiering-aware snapshots are taken and the time at which the tiering-aware snapshots are restored.

Although in the FIG. 1 embodiment the different instances of tiering-aware snapshotting logic 112 are shown as being implemented internal to the storage arrays 106 and outside the storage controllers 110, in other embodiments one or more of the instances of the tiering-aware snapshotting logic 112 may be implemented at least partially internal to the storage controllers 110 or at least partially outside the storage arrays 106, such as on one of the host devices 102, on one or more servers external to the host devices 102 and the storage arrays 106 (e.g., including on a cloud computing platform or other type of information technology (IT) infrastructure), etc.

At least portions of the functionality of the tiering-aware snapshotting logic 112 may be implemented at least in part in the form of software that is stored in memory and executed by a processor.

The host devices 102 and the storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and/or one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 106 in the present embodiment are assumed to comprise a persistent memory that is implemented using a flash memory or other type of non-volatile memory of the storage arrays 106. More particular examples include NAND-based flash memory or other types of non-volatile memory such as resistive RAM, phase change memory, spin torque transfer magneto-resistive RAM (STT-MRAM), etc. The persistent memory is further assumed to be separate from the storage devices 108 of the storage arrays 106, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 10 and 11.

It is to be understood that the particular set of elements shown in FIG. 1 for tiering-aware snapshotting for multiple-tier storage systems is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for tiering-aware snapshotting for multiple-tier storage systems will now be described in more detail with reference to the flow diagram of FIG. 2. It is to be understood that this particular process is only an example, and that additional or alternative processes for tiering-aware snapshotting for multiple-tier storage systems may be used in other embodiments.

In this embodiment, the process includes steps 200 through 204. These steps are assumed to be performed by one or more of the storage arrays 106 utilizing their respective instances of the tiering-aware snapshotting logic 112. The process begins with step 200, determining, for a given portion of data of a tiering-aware snapshot that is to be restored to a target storage system comprising a set of two or more storage tiers, tiering information characterizing a given storage tier in which the given portion of data was stored when the tiering-aware snapshot was taken.

In step 204, one of the storage tiers in the set of two or more storage tiers of the target storage system in which to store the given portion of data when restoring the tiering-aware snapshot to the target storage system is selected based at least in part on (i) the determined tiering information characterizing the given storage tier in which the given portion of data was stored when the tiering-aware snapshot was taken and (ii) one or more storage tier mapping policies mapping the given storage tier to the set of two or more storage tiers of the target storage system.

In step 204, the tiering-aware snapshot is restored to the target storage system by storing the given portion of data in the selected one of the storage tiers in the set of two or more storage tiers of the target storage system.

Figure 2:
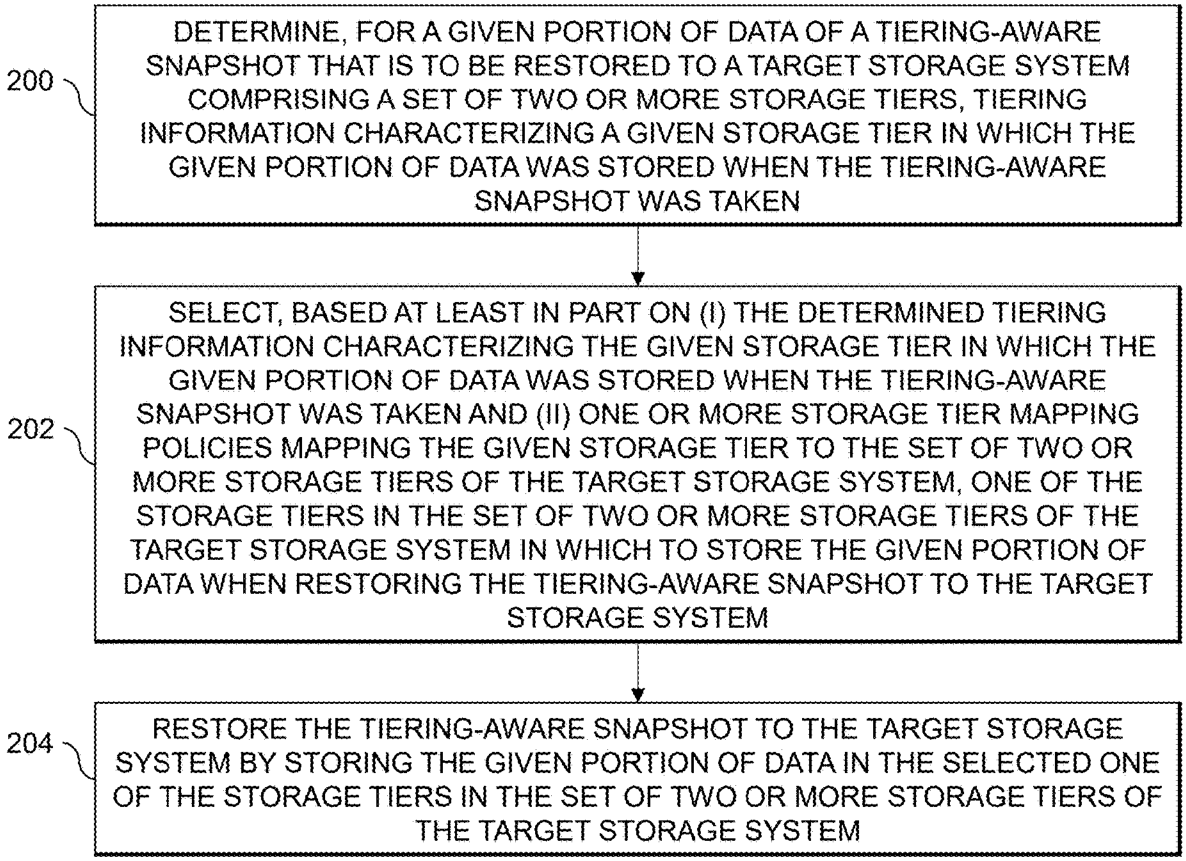
FIG. 2 is a flow diagram of an exemplary process for tiering-aware snapshotting for multiple-tier storage systems in an illustrative embodiment.

The FIG. 2 process, in some embodiments, also includes generating the tiering-aware snapshot. Generating the tiering-aware snapshot may comprise identifying, for each of a plurality of portions of data of one or more storage volumes, tiering information characterizing a storage tier in which that portion of the data of the one or more storage volumes is stored at the time the tiering-aware snapshot is taken, generating tiering-aware snapshot metadata for the tiering-aware snapshot, the tiering-aware snapshot comprising the identified tiering information, and associating the generated tiering-aware snapshot metadata with a snapshot of the one or more storage volumes. The tiering-aware snapshot may be generated for the one or more storage volumes on a source storage system different than the target storage system. The source storage system may have a set of two or more storage tiers that is different than the set of two or more storage tiers of the target storage system, the one or more storage tier mapping policies mapping respective ones of the storage tiers in the set of two or more storage tiers of the source storage system to ones of the storage tiers in the set of two or more storage tiers of the target storage system.

The selected one of the storage tiers in the set of two or more storage tiers of the target storage system in which to store the given portion of data when restoring the tiering-aware snapshot to the target storage system may be the given storage tier in which the given portion of data was stored when the tiering-aware snapshot was taken. Step 202 may include determining a current storage tier in the set of two or more storage tiers of the target storage system in which the given portion of data is stored prior to restoring the tiering-aware snapshot. Step 202 may also include responsive to the current storage tier being different than the given storage tier, determining whether a first performance level provided by the current storage tier is higher than a second performance level provided by the given storage tier. Step 202 may further include, responsive to determining that the first performance level provided by the current storage tier is higher than the second performance level provided by the given storage tier, selecting the current storage tier as the selected one of the storage tiers in the set of two or more storage tiers of the target storage system in which to store the given portion of data when restoring the tiering-aware snapshot to the target storage system. Step 202 may further include, responsive to determining that the first performance level provided by the current storage tier is lower than the second performance level provided by the given storage tier, selecting the given storage tier as the selected one of the storage tiers in the set of two or more storage tiers of the target storage system in which to store the given portion of data when restoring the tiering-aware snapshot to the target storage system.

Restoring the tiering-aware snapshot to the target storage system may comprise mounting one or more storage volumes associated with the snapshot as read/write storage volumes on the target storage system. Restoring the tiering-aware snapshot to the target storage system may comprise moving the given portion of data from another one of the storage tiers in the set of two or more storage tiers of the target storage system to the selected one of the storage tiers in the set of two or more storage tiers of the target storage system. Restoring the tiering-aware snapshot to the target storage system may comprise, responsive to the selected one of the storage tiers in the set of two or more storage tiers of the target storage system not having sufficient available capacity for the given portion of data, selecting another one of the set of two or more storage tiers of the target storage system on which to store the given portion of data based at least in part on the one or more storage tier mapping policies. The selected other one of the set of two or more storage tiers of the target storage system may provide a performance level that is closest to a performance level of the selected one of the set of two or more storage tiers of the target storage system.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments provide technical solutions for optimizing or improving snapshotting processes to perform "tiering-aware" snapshot and restore operations in multiple-tier storage systems with auto-tiering functionality. The technical solutions enable data placement among tiers to be maintained during the snapshot taking process, and enables end-users to select to perform tiering-aware snapshot restore operations where the data from snapshot is restored in accordance with tiering information that is determined when the snapshot is taken. Thus, the user has the option to restore the data placement among storage tiers when mounting a snapshot as read/write. The technical solutions are advantageously able to keep user data activity temperature to ensure user data service quality while also reducing wearing level for storage devices including SSD devices. The technical solutions may be utilized for any storage system that uses a multiple storage tier (multi-tier) configuration, and which has snapshot support (e.g., for taking and restoring snapshots).

Figure 3:
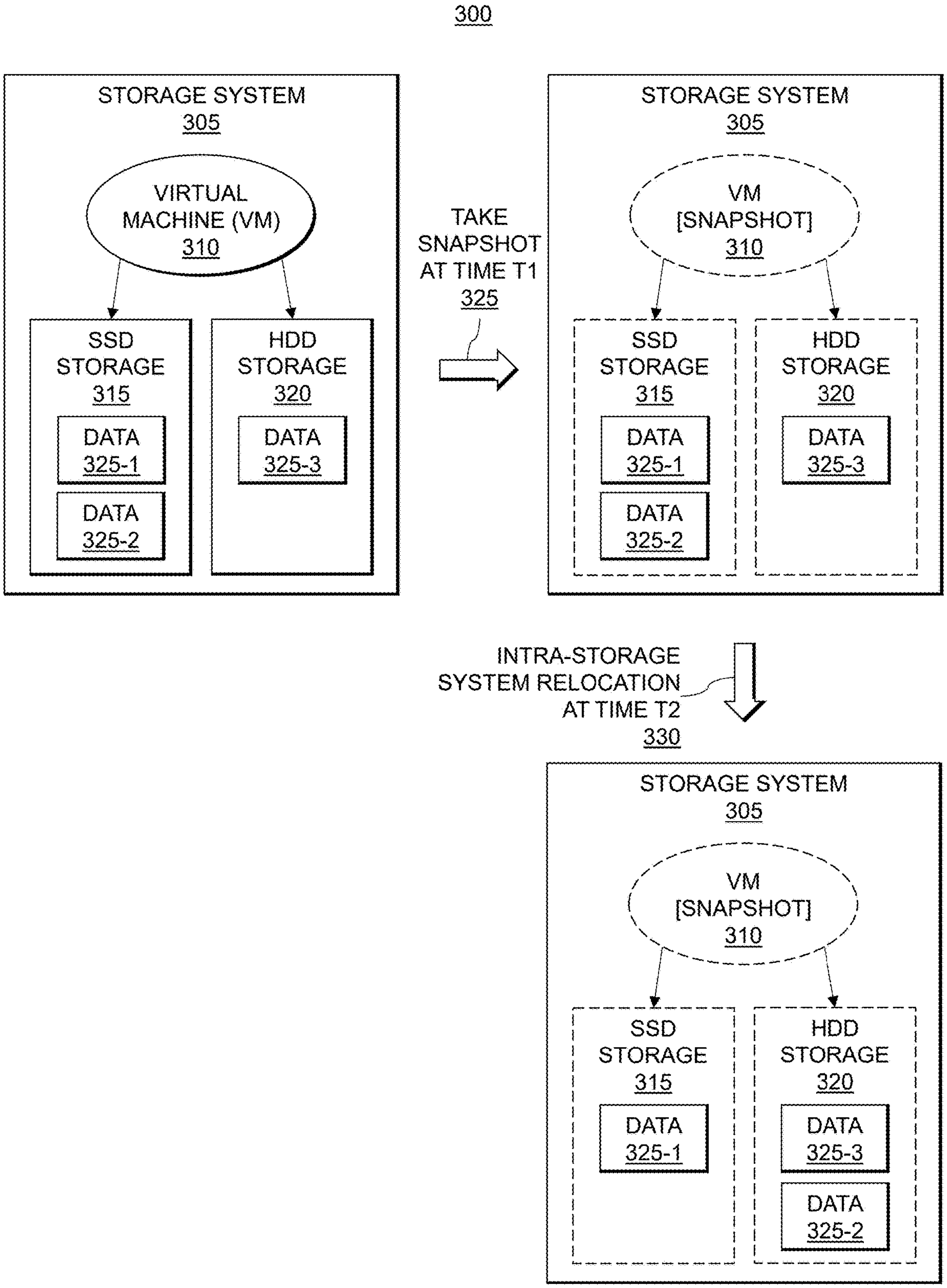
FIG. 3 shows snapshotting operations in a storage system which are not tiering-aware in an illustrative embodiment.

In conventional approaches, snapshot operations (e.g., taking snapshots, restoring snapshots) are not aware of data tiering in auto-tiering storage systems. Thus, when a snapshot is taken, data block activity temperature or other tiering information is not maintained. When a snapshot is later restored, including when a snapshot is mounted as read/write, there is no data tiering information for the snapshot and thus data blocks or other portions of the data of the snapshot may be mounted or restored to non-optimal storage tiers. This is illustrated in FIG. 3, which shows a system flow 300 of snapshotting operations for a storage system 305. In the FIG. 3 example, it is assumed that an end-user is using transactional storage services through running a virtual machine (VM) 310 or database services. The storage system 305 in this example has two storage tiers, an SSD storage 315 and HDD storage 320. "Hot" or frequently accessed data is placed in the SSD storage 315 while "cold" or infrequently accessed data is placed in the HDD storage 320 through auto-tiering functionality of the storage system 305 (e.g., Fully Automated Storage Tiering for Virtual Pools (FAST-VP) functionality, described in further detail below). As shown in FIG. 3, the storage system 305 initially stores data blocks 325-1 and 325-2 in SSD storage and stores data block 325-3 in HDD storage 320. At a time T1, a snapshot is taken 325 for the VM 310. After the snapshot is taken at time T1, intra-storage system relocation 330 (e.g., FAST-VP or other auto-tiering functionality) is performed for the storage system 305, where some of the hot data in the snapshot which was originally in the SSD storage 315 is moved to the HDD storage 320 (e.g., due to infrequent access of that data). This is shown in FIG. 3, as at time T2 the data block 325-2 that is part of the VM 310 snapshot is moved from the SSD storage 315 to the HDD storage 320. If an end-user restores the snapshot for the VM 310 after time T2, then performance of the VM 310 will be degraded as some of the "hot" data of the VM 310 (e.g., data block 325-2) was moved from the SSD storage 315 to the HDD storage 320 at time T2.

Figure 4:
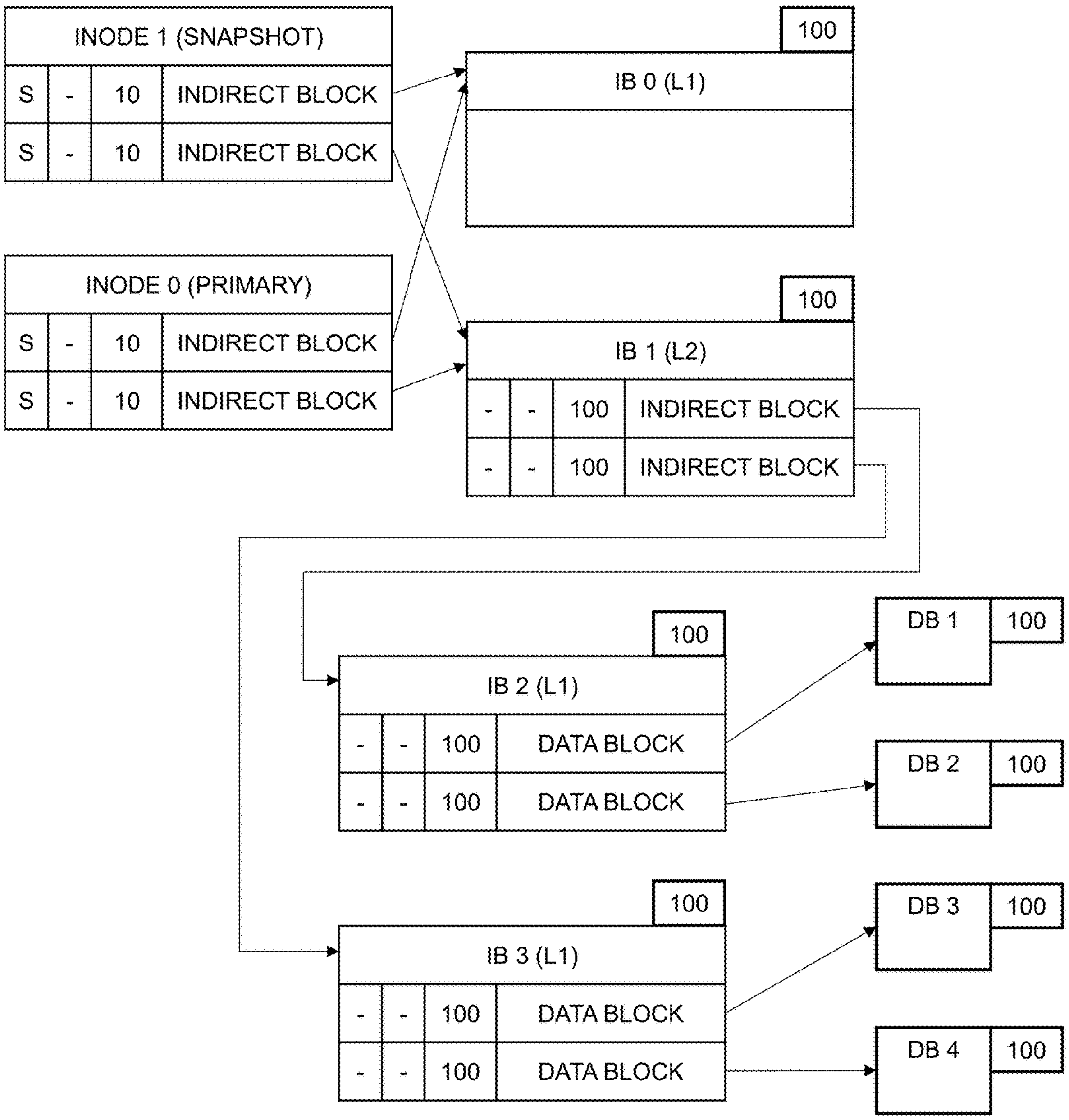
FIG. 4 shows a storage snapshot of a primary storage object in an illustrative embodiment.

A storage snapshot may include a set of reference markers for data at a particular point in time. The storage snapshot acts like a detailed table of contents, providing the user with accessibly copies of data that they can roll back to. Snapshot implementations may implement redirect on write (ROW) functionality for new writes to both the primary and snapshots of storage objects. When new write requests arrive to the primary storage, that data will be written to a new area and the original data is marked to be used by the snapshot. FIG. 4 shows an example snapshot 400 of a primary storage object. Snapshots can be scheduled to be taken automatically at specific times or frequencies, or in response to designated conditions. This helps to protect the data with an automatic snapshot schedule policy. When there is a need to roll back to a particular snapshot, the user can mount the snapshot to restore a file system (FS) or LUN to a given time point.

Fully Automated Storage Tiering for Virtual Pools (FAST-VP) functionality monitors data access patterns within storage pools on a storage system, and dynamically matches the performance requirements of the data with storage drives or devices (e.g., of a particular one of multiple storage tiers) that provide a corresponding level of performance. In some cases, FAST-VP classifies storage drives or devices into three categories or storage tiers: an Extreme Performance Tier comprised of flash drives; a Performance Tier comprise of Serial Attached SCSI (SAS) drives; and a Capacity Tier comprised of Near-Line SAS (NL-SAS) drives. FAST-VP tiering policies are used to make tiering choices for data within each of the storage pools. This setting is referred to as a tiering policy. FAST-VP uses these tiering policies to meet performance goals based on the storage resources that are available. The tiering policies may include: highest available tier; auto-tiering; starting high then auto-tiering (e.g., a default/recommended tiering policy); and lowest available tier.

FAST-VP bases relocation decisions on an algorithm which considers the activity level of each slice, and the resource's tiering policy. The algorithm then orders the slices based on a rank, which will later be used during the relocation window. This process is repeated periodically (e.g., hourly), and a data movement candidate list is created for all storage pools within the system. Relocations across the different storage tiers occur on blocks of data of a designated size (e.g., 256 megabytes (MB)), called slices. Common Block File System (CBFS), which is a block layer file system designed to manage block mapping, provides the raw function to replace the contents of one slice with another one without interrupting IO. CBFS uses a Data Manipulation Language (DML) to move data from the original data region to the new one.

FAST-VP uses the storage pool configuration information and IO statistics to calculate and assign temperatures to storage regions allocated from each storage pool (e.g., at the slice granularity, such as 256 MB). Data regions that are accessed more frequently are assigned a higher temperature than data regions that are not accessed as frequently (which may be assigned a colder temperature). FAST-VP uses the configuration information and the temperatures to build a prioritized list of data regions that should be moved to higher or lower tiered storage. This allows FAST-VP to try to keep the most frequently accessed data regions on the fastest storage for better response times.

Figure 5:
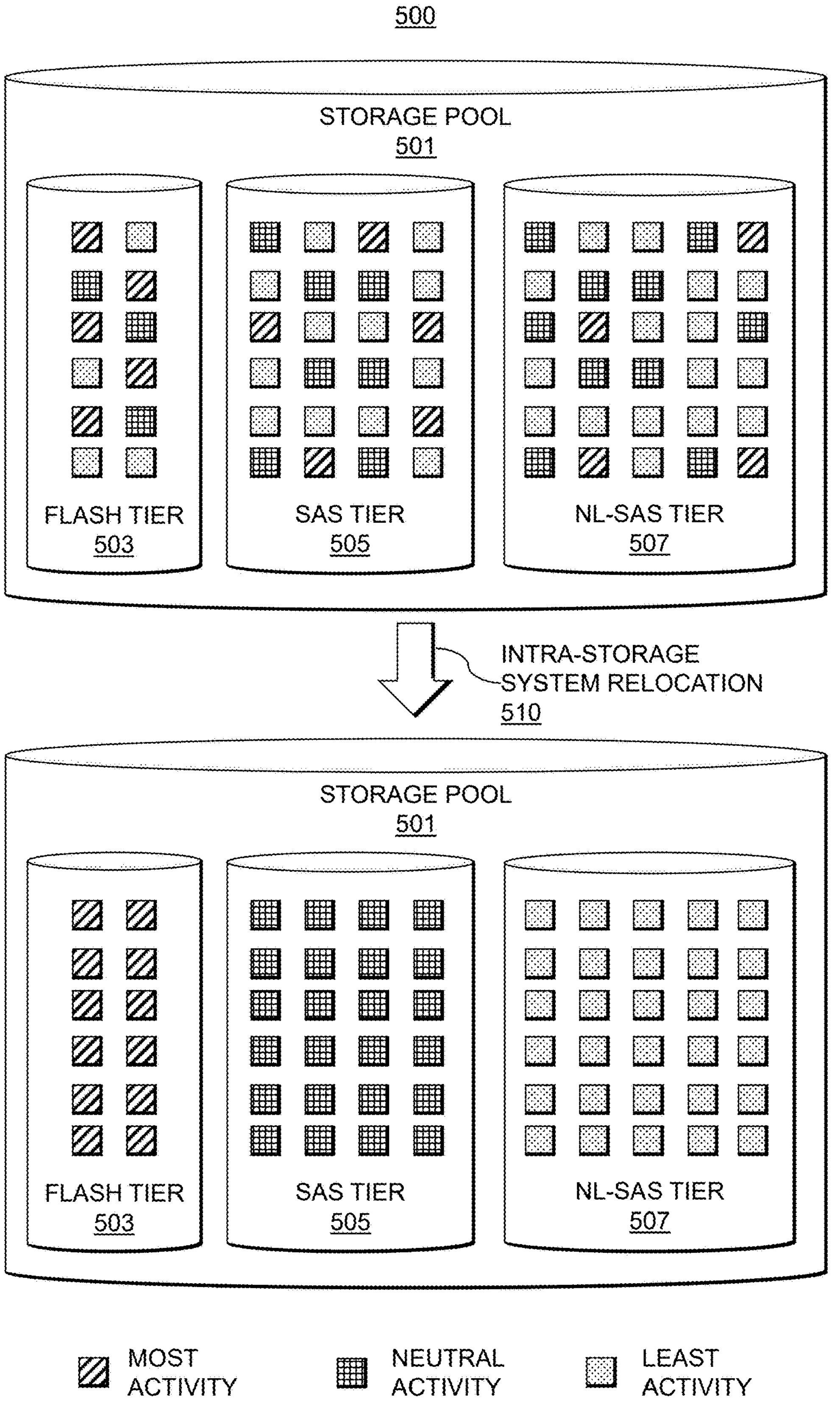
FIG. 5 shows an example of intra-storage system relocation of data among multiple storage tiers in an illustrative embodiment.

FIG. 5 shows a system 500 implementing intra-storage system relocation 510 of data among multiple storage tiers, also referred to herein as auto-tiering. In the system 500, a storage pool 501 comprises a flash tier 503 (e.g., an Extreme Performance Tier), a SAS tier 505 (e.g., a Performance Tier) and a NL-SAS tier 507 (e.g., a Capacity Tier). Prior to application of intra-storage system relocation 510 (e.g., using FAST-VP functionality), the data stored on the different storage tiers 503, 505 and 507 is not balanced according to the activity levels of the data. Following application of the intra-storage system relocation 510, the data stored on the different storage tiers 503, 505 and 507 is balanced according to the activity levels of the data, with the most active data stored on the flash tier 503, data with neutral activity stored on the SAS tier 505, and with the least active data stored on the NL-SAS tier 507.

As discussed above, conventional approaches for taking and restoring snapshots are not aware of data tiering in auto-tiering storage systems. Thus, the snapshot taking process in conventional approaches drops or ignores data block activity temperature or other tiering information. Further, when users restore snapshots in conventional approaches, such as when mounting a snapshot as read/write, data tiering information is not available and the data blocks of the snapshot are not able to be restored to their proper storage tier (e.g., based on the data block activity temperature). Some conventional approaches "pin" or keep snapshots in a hot storage tier, or disable intra-storage system relocation (e.g., FAST-VP) in snapshot use cases. While such approaches can partially solve snapshot performance degradation problems, these approaches come at the expense of losing the benefits of storage system auto-tiering functionality.

The technical solutions described herein provide functionality for tiering-aware snapshot operations. In some embodiments, the technical solutions keep tiering information for the snapshot in the form of a tiering range map. When a snapshot is mounted (e.g., for read/write), if a particular data range has been moved to a lower storage tier (e.g., as a result of auto-tiering functionality implemented by the storage systems, such as FAST-VP functionality), then the data will be promoted to a higher storage tier according to the tiering range map. The technical solutions are thus able to keep data block placement in an auto-tiering storage system during snapshot operations, such that users can expect consistent data IO performance after mounting snapshots for further read/write (e.g., as the data will be distributed across multiple storage tiers of the storage system in a manner similar to the distribution in place at the time the snapshot was taken).

When a snapshot is taken, if an end-user chooses to create a tiering aware snapshot (or if one or more designated trigger conditions are met, such as a policy for automatically creating tiering-aware snapshots, creating tiering-aware snapshots based on the priority or criticality of a snapshot which may be user-defined or determined automatically, etc.), a snapshot manager will send a request to the storage system to create a tiering-aware snapshot. Together with user data that the snapshot links to, a tiering range map (also referred to as a range-tier map) is generated for the working volume and added as additional metadata for the snapshot. FIG. 6 shows an example of a tiering range map 600, which records each data block range and its corresponding tier information (Tier_0, Tier_1, Tier_2, etc.). In this way, the block range-tier map information for the snapshot is determined and kept as part of the snapshot metadata.

Figure 7A:
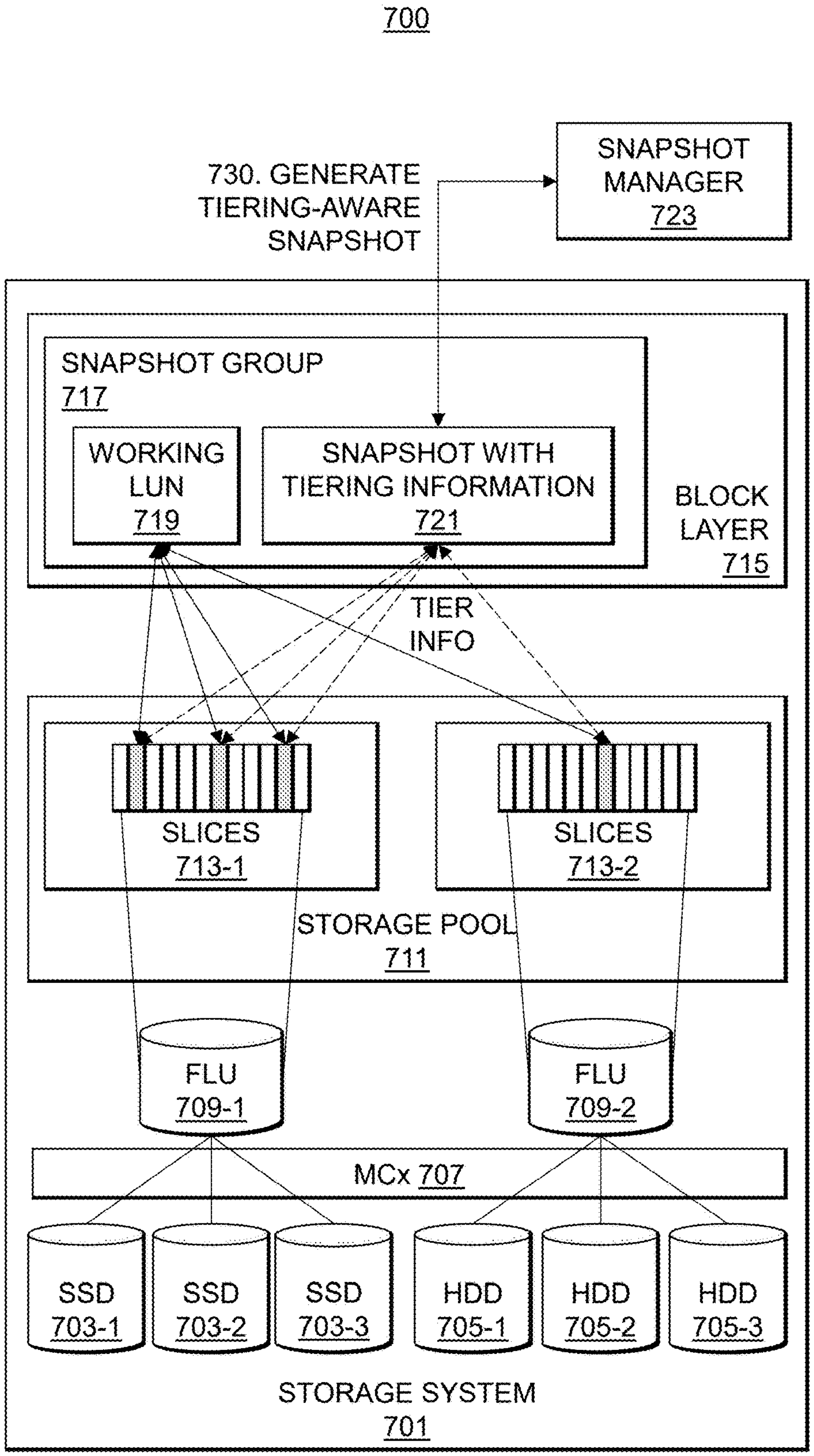
FIGS. 7A-7C show examples of tiering-aware snapshot operations performed in a storage system having multiple storage tiers in an illustrative embodiment.
Figure 7B:
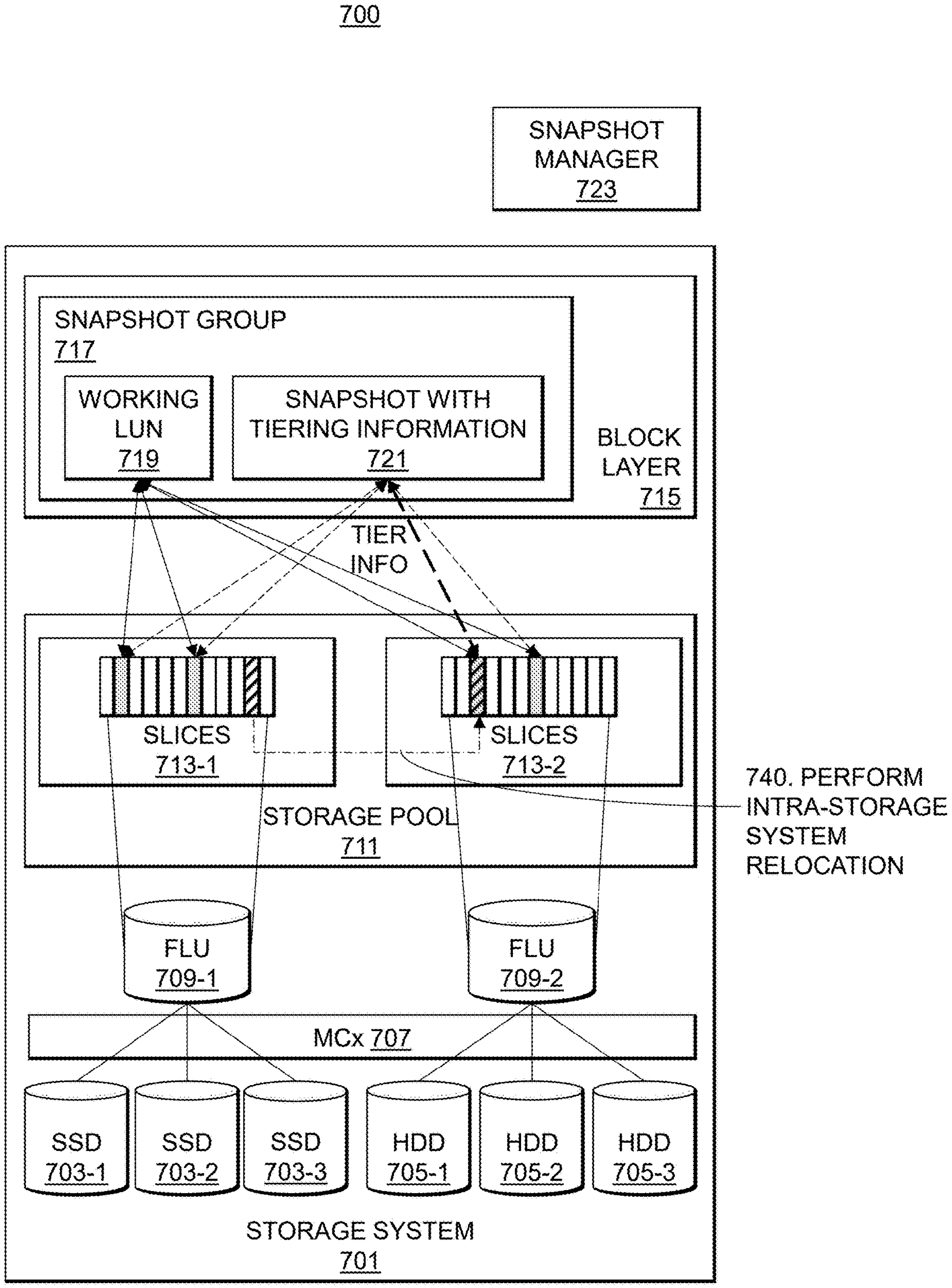
Figure 7C:
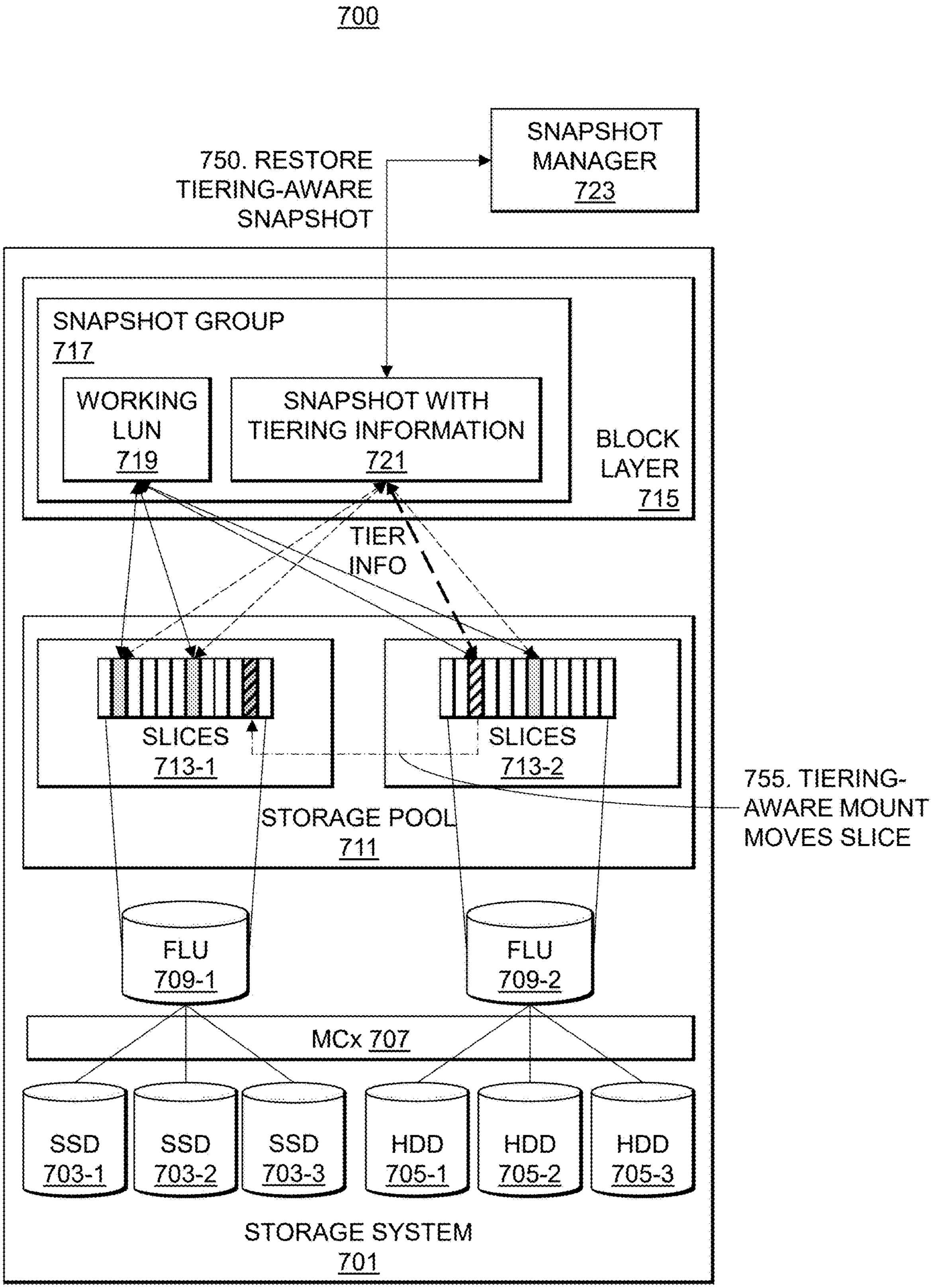

FIGS. 7A-7C show a system 700 configured for tiering-aware snapshotting operations. FIG. 7A shows the system 700 creating a tiering-aware snapshot in a storage system 701. The storage system 701 comprises storage devices including a set of SSDs 703-1, 703-2 and 703-3 (collectively, SSDs 703) and a set of HDDs 705-1, 705-2 and 705-3 (collectively, HDDs 705). The storage system 701 implements Multi-Core Services (MCx) 707, where x may represent cache/flush/RAID so that multiple processing cores of the storage system 701 are able to perform data mapping and IO. The SSDs 703 are associated with Flare Logical Unit (FLU) 709-1, and the HDDs 705 are associated with FLU 709-2. The storage system 701 comprises a storage pool 711, with slices 713-1 of the FLU 709-1 and slices 713-2 of the FLU 709-2. A block layer 715 of the storage system 701 implements a snapshot group 717 including a working LUN 719 and a snapshot with tiering information 721 (also referred to as a tiering-aware snapshot 721). A snapshot manager 723 (which is shown as external to the storage system 701, but in other cases may be implemented at least in part internal to the storage system 701) generates 730 the tiering-aware snapshot 721. The working LUN 719 accesses different ones of the slices 713 containing data that belong to the tiering-aware snapshot 721, and the tiering-aware snapshot 721 records tiering information (tier info) for such ones of the slices 713 that contain data that belong to the tiering-aware snapshot 721.

After the tiering-aware snapshot 721 is taken and as time goes by, the storage system 701 may perform intra-storage system relocation 740 (e.g., FAST-VP or other auto-tiering functionality) as illustrated in FIG. 7B. The intra-storage system relocation 740 shown in FIG. 7B includes moving one of the slices of data from slices 713-1 of the FLU 709-1 implemented using SSDs 703 to the slices 713-2 of the FLU 709-2 implemented using HDDs 705. This relocation may be due to such data of the snapshot being infrequently accessed after the tiering-aware snapshot 721 is taken.

FIG. 7C shows a restore operation 750 for the tiering-aware snapshot 721. Here, it is assumed that the restore operation 750 is a "tiering-aware" restore operation, although it should be noted that a tiering-aware snapshot may be used to perform a conventional or non-tiering-aware restore operation if desired. To perform the tiering-aware restore operation 750, the snapshot manager 723 will get the range-tier map ($Map_{snapshot}$) for the tiering-aware snapshot 721, and performs slice relocation 755 to relocate any slices that were moved to a lower storage tier (providing a lower performance level) back to higher storage tiers according to a designated slice relation policy. As shown in FIG. 7C, this includes movement of one of the slices of data from slices 713-2 of the FLU 709-2 implemented using HDDs 705 to the slices 713-1 of the FLU 709-1 implemented using SSDs 703 (i.e., the same slice that was previously moved during the intra-storage system relocation 740 shown in FIG. 7B). FIG. 8 shows an example of snapshot mapping rules 800 for tiering-aware snapshotting operations. According to the snapshot mapping rules 800, if the current tier of a slice of data is "higher" than the tiering information kept in the tiering-aware snapshot, then that slice of data is moved to the tier specified by the tiering information kept in the tiering-aware snapshot. For example, if a given slice of data is currently stored in the HDD tier of the storage system 701, but the tiering information in the tiering-aware snapshot 721 indicates that the given slice of data was in the SSD tier of the storage system 701 when the tiering-aware snapshot 721 was taken, then the given slice will be moved from the HDD tier to the SSD tier. Otherwise, the given slice may be kept in its current tier.

Tier mapping policies, also referred to as tier mapping rules, may be used to map between storage tiers when restoring a tiering-aware snapshot. In some cases, the arrangement of storage tiers may change between the time when a tiering-aware snapshot is taken and when the tiering-aware snapshot is restored (e.g., such as where a storage system adds or removes storage tiers). In other cases, a tiering-aware snapshot may be taken on a first storage system with a first arrangement of multiple storage tiers, and may be restored to a second storage system with a second different arrangement of multiple storage tiers. In still other cases, a tiering-aware snapshot may be taken on a first storage system and may be restored to a second storage system with the same arrangement of storage tiers as the first storage system, but where the storage capacities for different ones of the storage tiers may differ between the first and second storage systems. Various other examples are possible. In these and other cases, the tier mapping policies may map between different storage tiers (e.g., between first and second storage systems, between the same storage system when the number or arrangement and/or capacity of different storage tiers has changed between the time when the tiering-aware snapshot is taken and when the tiering-aware snapshot is to be restored).

Figure 9:
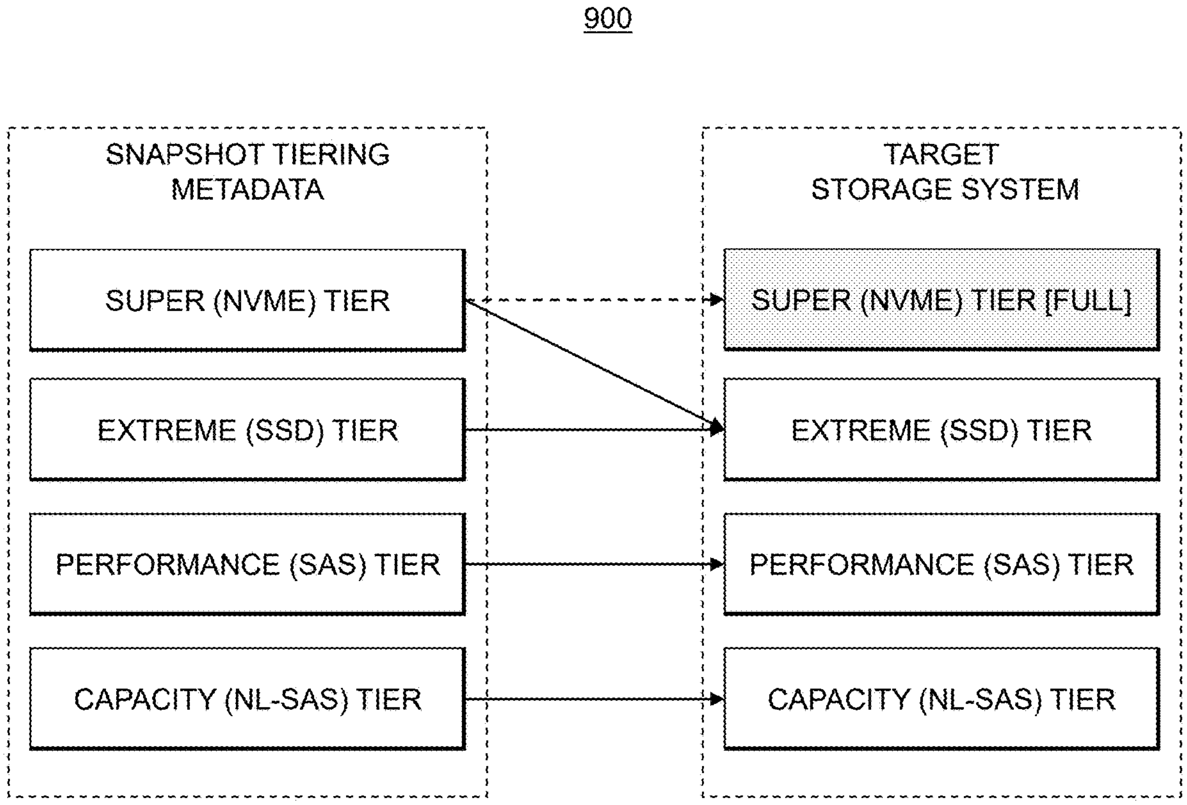
FIG. 9 shows an example of tier mapping rules with redirection due to a target storage tier of a storage system being full in an illustrative embodiment.

The tier mapping policies or rules may also specify IO redirection in the event that a target storage tier of the storage system where a tiering-aware snapshot is to be restored is full. If the target storage tier is full, data will be mapped to "sibling" storage tiers that still have free space. The "sibling" storage tiers may be those that are closest in performance to the target storage tier. FIG. 9 shows an example of tier mapping policies 900, where a target storage system (e.g., where a snapshot is being restored) has four storage tiers (a "Super" storage tier using NVMe drives, an "Extreme" storage tier using SSDs, a "Performance" storage tier using SAS drives, and a "Capacity" storage tier using NL-SAS drives), and where snapshot tiering metadata specifies which slices or other portions of data are storage in different ones of the same four storage tiers. In the event that the "Super" storage tier is full when performing a tiering-aware snapshot restore operation, data that is marked in the snapshot tiering metadata as belonging to the "Super" storage tier will instead be written to the nearest sibling storage tier, which in this example is the "Extreme" storage tier.

The technical solutions described herein enable tiering-aware snapshotting operations. The tiering-aware snapshotting operations may be performed when selected by an end-user (or automatically depending on system configuration) for both taking and restoring snapshots. Data placement based on activity temperature at the time the snapshots are taken is kept as metadata (snapshot tiering metadata) associated with the snapshot. When an end-user wants to restore a volume from the snapshot, the end-user can choose to perform a tiering-aware restore operation that ensures consistent IO performance of user applications after the snapshot restore. Thus, the technical solutions are advantageously able to avoid unwanted performance degradation following snapshot restore operations. The technical solutions ensure consistent IO performance of user applications before taking and after restoring snapshots in an auto-tiering storage system. Tiering-aware snapshot operations are performed based on data tiering information when taking a snapshot and restoring the data tiering layout when mounting or otherwise restoring the snapshot. Customized user data tiering information can be reserved to help end-users have stable IO performance.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for tiering-aware snapshotting for multiple-tier storage systems will now be described in greater detail with reference to FIGS. 10 and 11. Although described in the context of system 100, these platforms may also be used to implement at least portions of other information processing systems in other embodiments.

Figure 10:
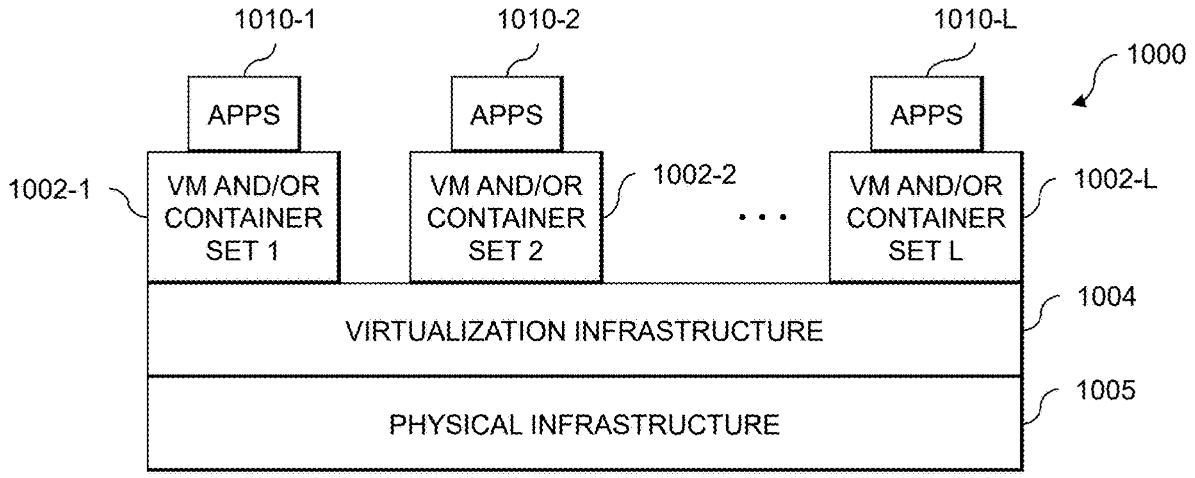
FIGS. 10 and 11 show examples of processing platforms that may be utilized to implement at least a portion of an information processing system in illustrative embodiments.
Figure 11:
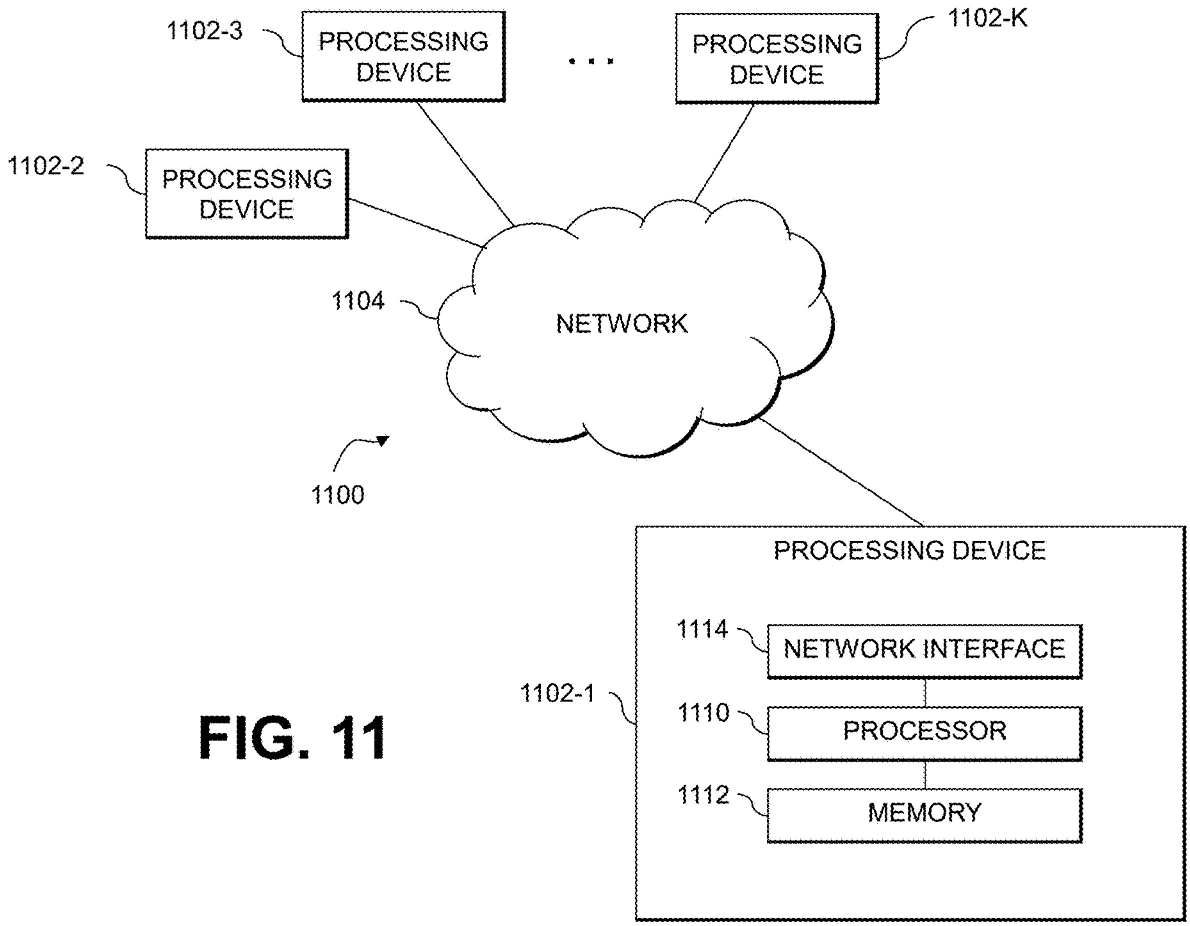

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU), a neural processing unit (NPU), a data processing unit (DPU), a System-On-Chip (SOC) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for tiering-aware snapshotting for multiple-tier storage systems as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to determine, for a given portion of data of a tiering-aware snapshot that is to be restored to a target storage system, tiering information characterizing a given one of a first set of two or more storage tiers of a source storage system in which the given portion of data was stored when the tiering-aware snapshot was taken on the source storage system;

to select, based at least in part on (i) the determined tiering information characterizing the given storage tier of the source storage system in which the given portion of data was stored when the tiering-aware snapshot was taken on the source storage system and (ii) one or more storage tier mapping policies mapping the given storage tier of the source storage system to a second set of two or more storage tiers of the target storage system, one of the storage tiers in the second set of two or more storage tiers of the target storage system in which to store the given portion of data when restoring the tiering-aware snapshot to the target storage system; and to restore the tiering-aware snapshot to the target storage system by storing the given portion of data in the selected one of the storage tiers in the second set of two or more storage tiers of the target storage system;

wherein the first set of two or more storage tiers of the source storage system provide a first set of two or more different performance levels and the second set of two or more storage tiers of the target storage system provide a second set of two or more different performance levels; and wherein the one or more storage tier mapping policies map each storage tier in the first set of two or more storage tiers of the source storage system to one or more storage tiers in the second set of two or more storage tiers of the target storage system based at least in part on:

available capacity of storage tiers in the second set of two or more storage tiers; and matching the second set of two or more different performance levels of storage tiers in the second set of two more storage tiers of the target storage system with the first set of two or more different performance levels of storage tiers in the first set of two or more storage tiers of the source storage system.

2. The apparatus of claim 1 wherein the at least one processing device is further configured to generate the tiering-aware snapshot.

3. The apparatus of claim 2 wherein generating the tiering-aware snapshot comprises:

identifying, for each of a plurality of portions of data of one or more storage volumes, tiering information characterizing a storage tier in which that portion of the data of the one or more storage volumes is stored on the source storage system at the time the tiering-aware snapshot is taken;

generating tiering-aware snapshot metadata for the tiering-aware snapshot, the tiering-aware snapshot comprising the identified tiering information; and associating the generated tiering-aware snapshot metadata with a snapshot of the one or more storage volumes.

4. The apparatus of claim 3 wherein the first set of one or more storage tiers of the source storage system is different than the second set of two or more storage tiers of the target storage system.

5. The apparatus of claim 4 wherein the one or more storage tier mapping policies map respective ones of the storage tiers in the first set of two or more storage tiers of the source storage system to ones of the storage tiers in the second set of two or more storage tiers of the target storage system based at least in part on storage device types of storage devices providing storage capacity for the storage tiers of the first set of two or more storage tiers of the source storage system and the storage tiers of the second set of two or more storage tiers of the target storage system.

6. The apparatus of claim 1 wherein the selected one of the storage tiers in the second set of two or more storage tiers of the target storage system in which to store the given portion of data when restoring the tiering-aware snapshot to the target storage system provides a same performance level as the given storage tier of the first set of two or more storage tiers of the source storage system in which the given portion of data was stored when the tiering-aware snapshot was taken on the source storage system.

7. The apparatus of claim 1 wherein selecting the one of the storage tiers in the second set of two or more storage tiers of the target storage system in which to store the given portion of data when restoring the tiering-aware snapshot to the target storage system comprises determining a current storage tier in the second set of two or more storage tiers of the target storage system in which the given portion of data is stored prior to restoring the tiering-aware snapshot.

8. The apparatus of claim 7 wherein selecting the one of the storage tiers in the second set of two or more storage tiers of the target storage system in which to store the given portion of data when restoring the tiering-aware snapshot to the target storage system comprises, responsive to the current storage tier being different than the given storage tier, determining whether a first performance level provided by the current storage tier is higher than a second performance level provided by the given storage tier.

9. The apparatus of claim 8 wherein selecting the one of the storage tiers in the second set of two or more storage tiers of the target storage system in which to store the given portion of data when restoring the tiering-aware snapshot to the target storage system comprises, responsive to determining that the first performance level provided by the current storage tier is higher than the second performance level provided by the given storage tier, selecting the current storage tier as the selected one of the storage tiers in the second set of two or more storage tiers of the target storage system in which to store the given portion of data when restoring the tiering-aware snapshot to the target storage system.

10. The apparatus of claim 8 wherein selecting the one of the storage tiers in the second set of two or more storage tiers of the target storage system in which to store the given portion of data when restoring the tiering-aware snapshot to the target storage system comprises, responsive to determining that the first performance level provided by the current storage tier is lower than the second performance level provided by the given storage tier, selecting the given storage tier as the selected one of the storage tiers in the second set of two or more storage tiers of the target storage system in which to store the given portion of data when restoring the tiering-aware snapshot to the target storage system.

11. The apparatus of claim 1 wherein restoring the tiering-aware snapshot to the target storage system comprises mounting one or more storage volumes associated with the tiering-aware snapshot as read/write storage volumes on the target storage system.

12. The apparatus of claim 1 wherein restoring the tiering-aware snapshot to the target storage system comprises moving the given portion of data from another one of the storage tiers in the second set of two or more storage tiers of the target storage system to the selected one of the storage tiers in the second set of two or more storage tiers of the target storage system.

13. The apparatus of claim 1 wherein restoring the tiering-aware snapshot to the target storage system comprises, responsive to the selected one of the storage tiers in the second set of two or more storage tiers of the target storage system not having sufficient available capacity for the given portion of data, selecting another storage tier in the second set of two or more storage tiers of the target storage system on which to store the given portion of data based at least in part on the one or more storage tier mapping policies.

14. The apparatus of claim 13 wherein the selected other one of the second set of two or more storage tiers of the target storage system provides a performance level that is closest to a performance level of the selected one of the second set of two or more storage tiers of the target storage system.

15. A computer program product comprising a non-transitory processor-readable storage medium having stored therein program code of one or more software programs, wherein the program code when executed by at least one processing device causes the at least one processing device:

to determine, for a given portion of data of a tiering-aware snapshot that is to be restored to a target storage system, tiering information characterizing a given one of a first set of two or more storage tiers of a source storage system in which the given portion of data was stored when the tiering-aware snapshot was taken on the source storage system;

to select, based at least in part on (i) the determined tiering information characterizing the given storage tier of the source storage system in which the given portion of data was stored when the tiering-aware snapshot was taken on the source storage system and (ii) one or more storage tier mapping policies mapping the given storage tier of the source storage system to a second set of two or more storage tiers of the target storage system, one of the storage tiers in the second set of two or more storage tiers of the target storage system in which to store the given portion of data when restoring the tiering-aware snapshot to the target storage system; and to restore the tiering-aware snapshot to the target storage system by storing the given portion of data in the selected one of the storage tiers in the second set of two or more storage tiers of the target storage system;

wherein the first set of two or more storage tiers of the source storage system provide a first set of two or more different performance levels and the second set of two or more storage tiers of the target storage system provide a second set of two or more different performance levels; and wherein the one or more storage tier mapping policies map each storage tier in the first set of two or more storage tiers of the source storage system to one or more storage tiers in the second set of two or more storage tiers of the target storage system based at least in part on:

available capacity of storage tiers in the second set of two or more storage tiers; and matching the second set of two or more different performance levels of storage tiers in the second set of two more storage tiers of the target storage system with the first set of two or more different performance levels of storage tiers in the first set of two or more storage tiers of the source storage system.

16. The computer program product of claim 15 wherein the selected one of the storage tiers in the second set of two or more storage tiers of the target storage system in which to store the given portion of data when restoring the tiering-aware snapshot to the target storage system provides a same performance level as the given storage tier of the first set of two or more storage tiers of the source storage system in which the given portion of data was stored when the tiering-aware snapshot was taken on the source storage system.

17. The computer program product of claim 15 wherein restoring the tiering-aware snapshot to the target storage system comprises moving the given portion of data from another one of the storage tiers in the second set of two or more storage tiers of the target storage system to the selected one of the storage tiers in the second set of two or more storage tiers of the target storage system.

18. A method comprising:

determining, for a given portion of data of a tiering-aware snapshot that is to be restored to a target storage system, tiering information characterizing a given one of a first set of two or more storage tiers of a source storage system in which the given portion of data was stored when the tiering-aware snapshot was taken on the source storage system;

selecting, based at least in part on (i) the determined tiering information characterizing the given storage tier of the source storage system in which the given portion of data was stored when the tiering-aware snapshot was taken on the source storage system and (ii) one or more storage tier mapping policies mapping the given storage tier of the source storage system to a second set of two or more storage tiers of the target storage system, one of the storage tiers in the second set of two or more storage tiers of the target storage system in which to store the given portion of data when restoring the tiering-aware snapshot to the target storage system; and restoring the tiering-aware snapshot to the target storage system by storing the given portion of data in the selected one of the storage tiers in the second set of two or more storage tiers of the target storage system;

wherein the first set of two or more storage tiers of the source storage system provide a first set of two or more different performance levels and the second set of two or more storage tiers of the target storage system provide a second set of two or more different performance levels;

wherein the one or more storage tier mapping policies map each storage tier in the first set of two or more storage tiers of the source storage system to one or more storage tiers in the second set of two or more storage tiers of the target storage system based at least in part on:

available capacity of storage tiers in the second set of two or more storage tiers; and matching the second set of two or more different performance levels of storage tiers in the second set of two more storage tiers of the target storage system with the first set of two or more different performance levels of storage tiers in the first set of two or more storage tiers of the source storage system; and wherein the method is performed by at least one processing device comprising a processor coupled to a memory.

19. The method of claim 18 wherein the selected one of the storage tiers in the second set of two or more storage tiers of the target storage system in which to store the given portion of data when restoring the tiering-aware snapshot to the target storage system provides a same performance level as the given storage tier of the first set of two or more storage tiers of the source storage system in which the given portion of data was stored when the tiering-aware snapshot was taken on the source storage system.

20. The method of claim 18 wherein restoring the tiering-aware snapshot to the target storage system comprises moving the given portion of data from another one of the storage tiers in the second set of two or more storage tiers of the target storage system to the selected one of the storage tiers in the second set of two or more storage tiers of the target storage system.

* * * * *